United States Patent
Nunes

(10) Patent No.: US 6,860,568 B2
(45) Date of Patent: Mar. 1, 2005

(54) WHEEL RIM COVER FOR A VEHICLE

(75) Inventor: Mitch Nunes, Brandon, FL (US)

(73) Assignee: Keystone Automotive Industries, Inc., Pomona, CA (US)

(*) Notice: Subject to any disclaimer, the term of this patent is extended or adjusted under 35 U.S.C. 154(b) by 0 days.

(21) Appl. No.: 10/434,139

(22) Filed: May 8, 2003

(65) Prior Publication Data

US 2004/0222688 A1 Nov. 11, 2004

(51) Int. Cl.[7] .............................. B60B 7/01; B60B 7/12; B60B 7/00
(52) U.S. Cl. .............................. 301/37.23; 301/37.106; 301/37.32
(58) Field of Search .................... 301/37.33, 37.101, 301/37.22, 37.23, 37.102, 37.31–37.32, 37.34, 37.12, 37.24

(56) References Cited

U.S. PATENT DOCUMENTS

| | | | |
|---|---|---|---|
| 3,528,705 A | 9/1970 | Oldroyd | |
| 4,295,685 A | 10/1981 | Spisak | |
| 4,787,681 A | 11/1988 | Wang et al. | |
| 5,205,615 A | 4/1993 | Narita et al. | |
| 5,232,270 A | 8/1993 | Helterbrand | |
| 5,842,750 A | 12/1998 | Murray et al. | |
| 6,089,671 A | 7/2000 | Iacovelli et al. | |
| 6,406,100 B1 | 6/2002 | Kinstler | |
| 6,419,327 B1 | 7/2002 | Renshaw | |
| 6,575,537 B1 * | 6/2003 | Wang | 301/37.23 |
| 6,688,703 B1 * | 2/2004 | Wang | 301/37.23 |
| 6,712,432 B1 * | 3/2004 | Cheng | 301/37.23 |
| 6,726,290 B1 * | 4/2004 | Yue | 301/37.23 |

* cited by examiner

Primary Examiner—Russell D. Stormer
Assistant Examiner—Jason R. Bellinger
(74) Attorney, Agent, or Firm—Larson & Larson, PA; Herbert W. Larson

(57) ABSTRACT

A wheel cover is constructed to include an inner cap for covering a vehicle wheel, the inner cap having back mounting lugs for fastening to a wheel rim. The inner cap has a plurality of through holes and a plurality of stub barrels around the through holes protruding inwardly. An outer cap is adapted to cover the inner cap, the outer cap having a plurality of cylindrical mounting rods protruding inwardly and inserted into the through holes of the inner cap. A plurality of screws equipped with a washer is fastened to the mounting rods of the outer cap and a compression spring surrounds each mounting rod and is mounted in each stub barrel between the inner cap back wall and the washer.

10 Claims, 4 Drawing Sheets

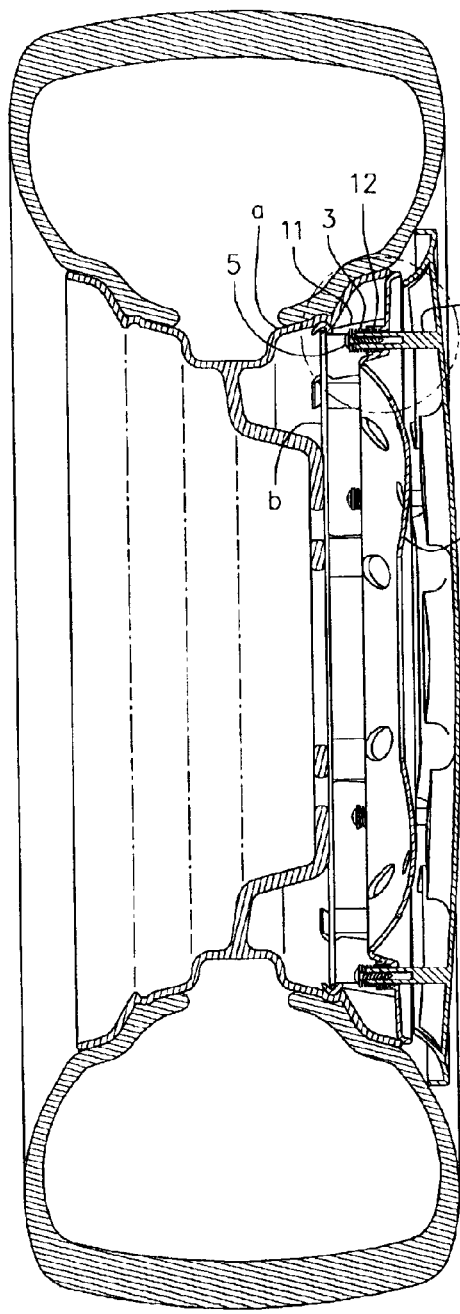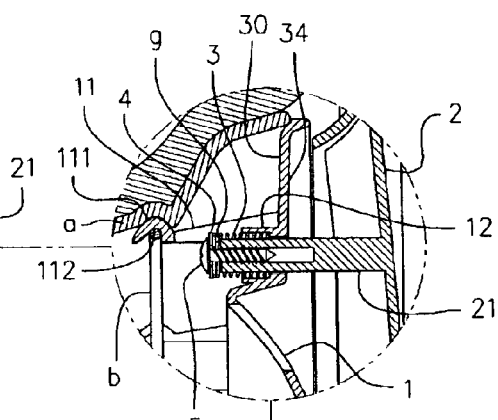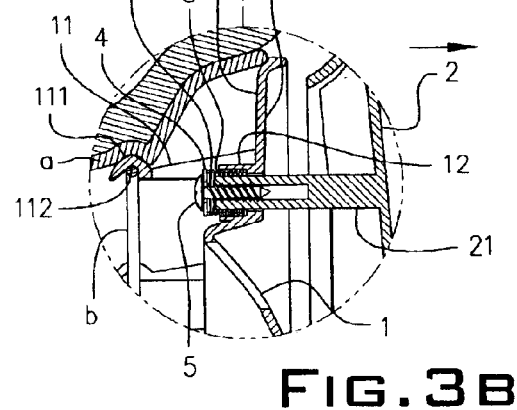
FIG. 3
FIG. 3A
FIG. 3B

WHEEL RIM COVER FOR A VEHICLE

BACKGROUND OF THE INVENTION

1. Field of the Invention

The present invention relates to a wheel rim cover for an automotive vehicle. More particularly, it refers to a wheel rim cover having two components; namely, an inner cap and an outer cap, the outer cap covering the inner cap supported by compression springs on the inner cap.

2. Background of the Invention

Each wheel of a vehicle is usually covered with a wheel rim cover for decoration and protection. However, a wheel rim cover may not be able to cover the wheel completely. Further, because a wheel rim cover is directly fastened to the side rim of the wheel, it may be forced off the side rim when the vehicle is moving on an uneven road surface. A wheel rim cover capable of absorbing road shock is needed.

SUMMARY OF THE INVENTION

The present invention solves the above problems. It is the object of the present invention to provide a wheel rim cover for a vehicle which completely covers the wheel. It is another object of the present invention to provide a wheel rim cover for a vehicle which has a means to absorb shock. To achieve these and other objects of the present invention, the wheel rim has an inner cap for covering the outer wheel disk of a vehicle wheel. The inner cap has a front wall, a back wall, a plurality of mounting lugs protruding from the back wall for fastening to the wheel rim of a vehicle wheel, a plurality of through holes extending through the front wall and the back wall and a plurality of stub barrels respectively protruding from the back wall around the through holes. An outer cap is adapted to cover the inner cap, the outer cap having a plurality of cylindrical mounting rods protruding from a back wall thereof and inserted into the through holes of the inner cap. The mounting rods each have a free end with a screw hole in such free end. A plurality of screws are threaded into the screw holes of the mounting rods of the outer cap and a plurality of washers are mounted on the screws. A plurality of compression springs are mounted within the stub barrels of the inner cap around the mounting rods of the outer cap and compressed between the back wall of the inner cap and the washers. The outer cap has a diameter greater than the inner cap. For example, the inner cap can be made having an outer diameter equal to the 14 inch or 15 inch disk wheel diameter of a vehicle, and the outer cap can be made having an outer diameter of 16 inches or 17 inches, respectively. Thus, the outer cap covers the inner cap and the wheel.

BRIEF DESCRIPTION OF THE DRAWINGS

The invention can be best understood by those having ordinary skill in the art of vehicle rim caps by reference to the following detailed description when considered in conjunction with the accompanying drawings in which:

FIG. 3 is a sectional view showing the rim cap installed on a wheel rim according to the present invention.

FIG. 3A is an enlarged view of the compression spring shown in FIG. 3.

FIG. 3B is similar to FIG. 3A but showing the buffering action of the compression spring.

DETAILED DESCRIPTION OF THE PREFERRED EMBODIMENT

Figure 1:
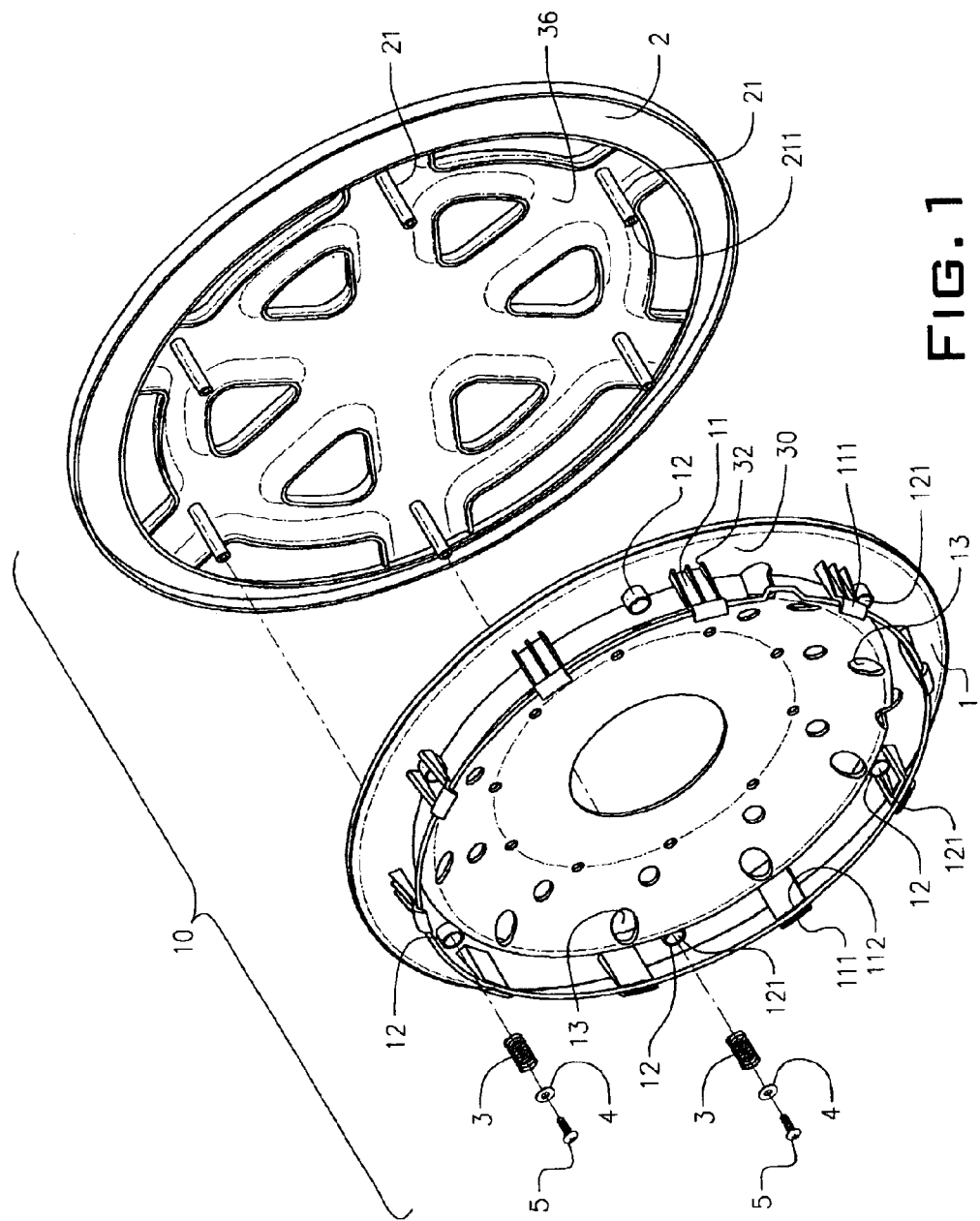
FIG. 1 is an exploded view of a rim cap for a vehicle according to the present invention.

Throughout the following detailed description, the same reference numerals refer to the same elements in all figures.

Figure 2:
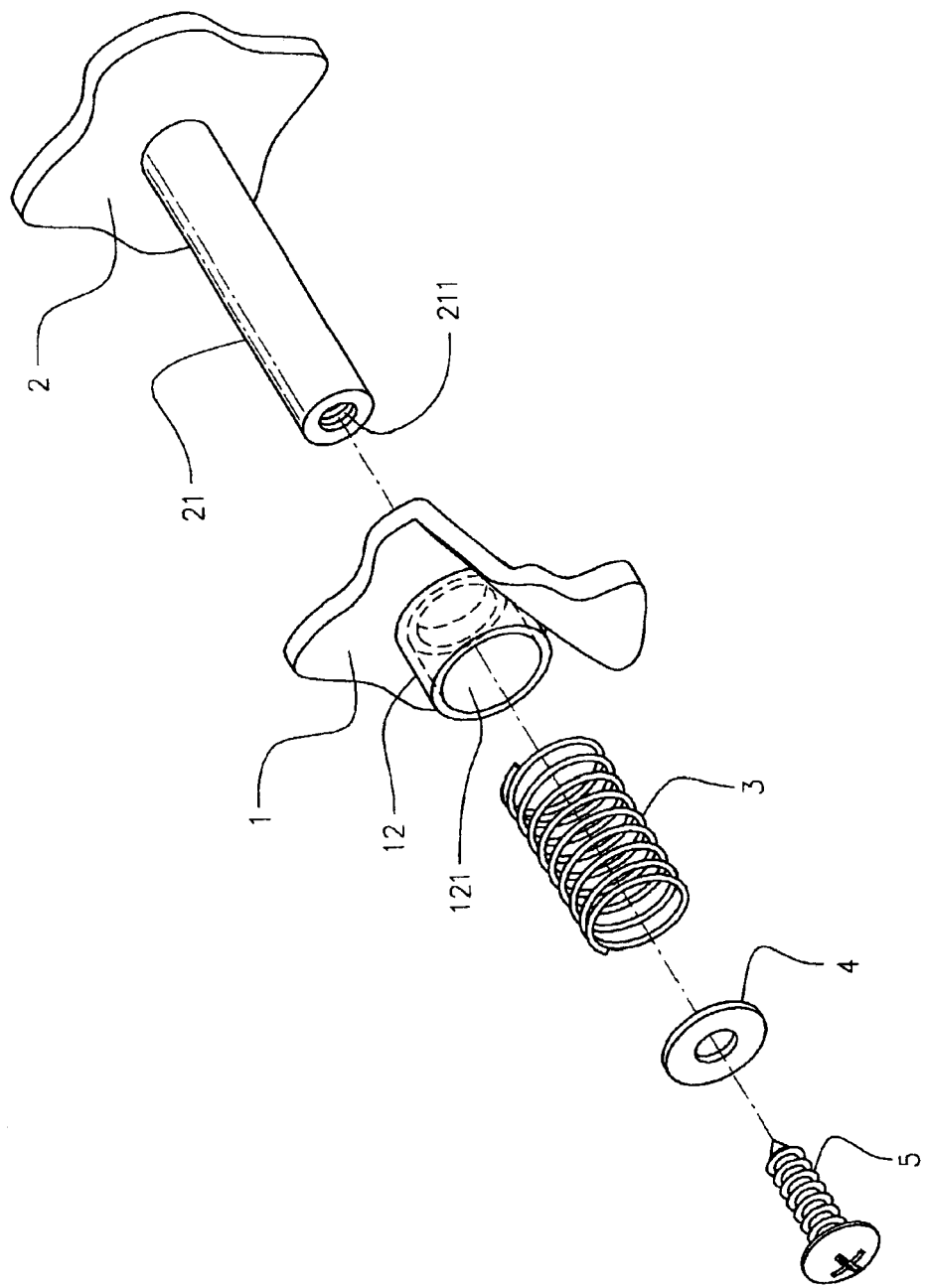
FIG. 2 is an exploded view in an enlarged scale of the connecting parts of the rim cap two components for a vehicle according to the present invention.

Referring to FIGS. 1 and 2, a rim cap 10 for a vehicle 40 in accordance with the present invention is shown as having an inner cap 1 and an outer cap 2.

Referring to FIGS. 3, 3A and 3B and FIGS. 1 and 2 again, the inner cap 1 has a plurality of mounting lugs 11 protruding from the back wall 30 and equiangularly spaced near the border 32. A plurality of through holes 121 extend through the front 34 and back walls 30, and a plurality of stub barrels 12 protrude from the back wall 30 around the through holes 121. The mounting lugs 11 each have an inner engagement portion 112 for engagement with the periphery of the disk wheel side rim b, and an outer engagement portion 111 for engagement with the disk wheel portion a. The outer cap 2 covering the inner cap 1 has a plurality of cylindrical mounting rods 21 protruding from the back wall 36 and inserted into the through holes 121 of the inner cap 1. Each mounting rod 21 has a threaded hole 211 in the free end. The diameter of the outer cap 2 is greater than the inner cap 1 so that the outer cap 2 hides the inner cap 1 from sight when the rim cap is installed on a vehicle wheel.

Referring to FIGS. 2, 3, 3A and 3B again, the mounting rods 21 of the outer cap 2 are inserted in the through holes 121 of the inner cap 1 and secured thereto by a fastening device, which is a compression spring 3 sleeved onto the corresponding mounting rod 21 and mounted within stub barrel 12. A washer 4 is supported on one end of the compression spring 3 with the second end of the compression spring 3 inserted into the stub barrel 12. A screw 5 is inserted through the washer 4 and the compression spring 3 and threaded into the threaded hole 211 of the corresponding mounting rod 0.21 to secure the corresponding mounting rod 21 to the corresponding stub barrel 12. By adjusting the tightness of the screw 5 in the threaded hole 211, the tension on the compression spring 3 is adjusted. Further, the inner cap 1 has a plurality of through holes 13 for ventilation.

Figure 4:
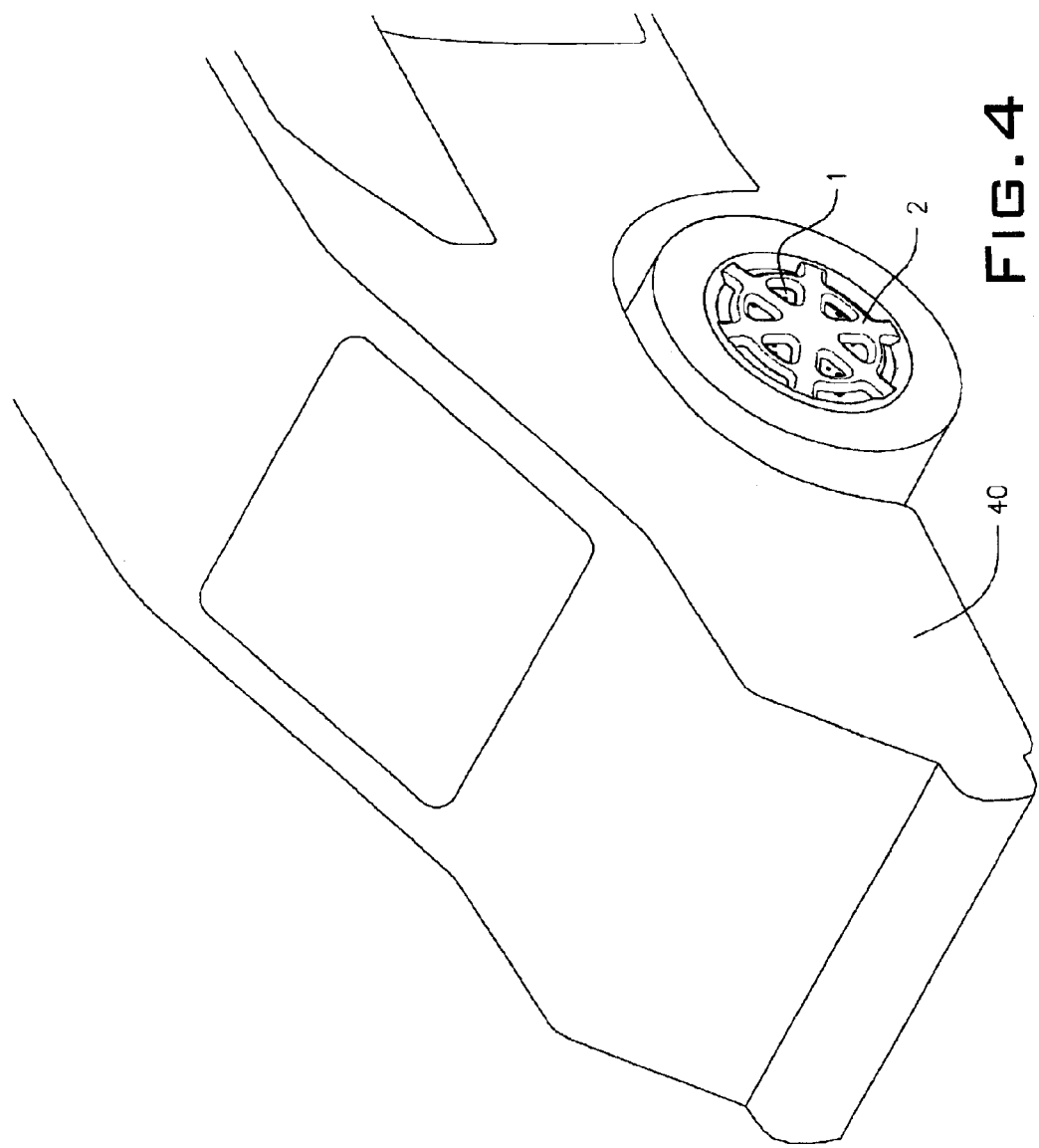
FIG. 4 is a perspective view showing the outer and inner cap covering the wheel rim mounted on a vehicle.

FIG. 4 shows the rim cap of the present invention installed on one wheel of a vehicle. As indicated, the outer cap 2 covers both the inner cap 1 and the disc wheel.

As indicated above, compression springs 3 are supported between the outer cap 2 and the inner cap 1 to absorb vibrations. When the vehicle moves along an uneven road surface, the compression springs 3 absorb a vibrating force from the wheel. Therefore, the rim cap 10 does not disengage from the wheel rim when the vehicle is moving on an uneven road surface. Further, because the diameter of the outer cap 2 is greater than the inner cap 1 diameter and the diameter of the wheel, the outer cap 2 keeps the inner cap 1 and the wheel covered.

The vehicle 40 can be a passenger automobile or a truck. The diameter of the inner cap 1 and outer cap 2 will vary depending on the diameter of the wheel being covered. The inner cap 1 can be made from a high strength plastic or light weight metal such as aluminum. The outer cap 2 is made of a light weight metal and has a high gloss silver like finish.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A wheel rim cover for a vehicle wheel comprising:

an annular inner cap having a plurality of mounting lugs protruding from a back wall for attaching the inner cap to a rim of the vehicle wheel, a plurality of stub barrels having through bores, the stub barrels annularly spaced apart around an outer portion of the back wall of the inner cap;

an annular outer cap having a diameter greater than the inner cap, a plurality of annularly spaced apart mounting cylinders protruding from a back wall of the outer cap, the plurality of mounting cylinders each having a threaded interior end bore for receipt of a screw;

the plurality of mounting cylinders each aligned through the bore in the stub barrel; and a spring surrounding each of the plurality of mounting cylinders within one of the stub barrels and the spring compressed between the back wall of the inner cap and the screw.

2. A wheel rim cover for a vehicle wheel according to claim 1 wherein the back wall of the inner cap has an annular opening in a center portion to accommodate a hub of the wheel.

3. A wheel rim cover for a vehicle wheel according to claim 1 wherein a first end of the spring is positioned against the inner cap back wall within the stub barrel and a second end is positioned against a washer juxtaposed to a head of the screw.

4. A wheel rim cover for a vehicle wheel comprising:

an inner cap, the inner cap having a front wall, a back wall, a plurality of mounting lugs protruding from the back wall for fastening to the vehicle wheel rim and a plurality of annularly spaced apart stub barrels protruding from the back wall, each stub barrel having a bore extending through the front wall of the inner cap;

an outer cap adapted to cover said inner cap, said outer cap having a plurality of annularly spaced apart mounting rods protruding from a back wall, the mounting rods passing through the inner cap front wall and the stub barrel through bore;

the mounting rods each having a threaded hole;

a plurality of screws, each screw threaded into the threaded hole of a mounting rod;

a plurality of washers mounted on said screws; and a plurality of compression springs, each compression spring mounted at one end within the stub barrel around the mounting rod and compressed between the back wall of the inner cap and the washer.

5. The wheel rim cover for a vehicle according to claim 4 wherein the outer cap has a diameter greater than the said inner cap.

6. A wheel rim cover for a vehicle wheel comprising:

an inner cap and an outer cap juxtaposed so that an inner wall of the outer cap is partially spaced from an outer wall of the inner cap;

the inner cap having protruding from an inner wall multiple mounting lugs spaced apart annularly in a peripheral portion for attachment to a rim of the vehicle wheel;

the inner cap having multiple stub barrels spaced apart annularly inboard from the mounting lugs;

the stub barrels having through bores connecting a front wall and the inner wall of the inner cap;

the inner wall of the outer cap having multiple cylindrical mounting rods, each rod projecting inwardly and aligned within the bore of a stub barrel and surrounded within the stub barrel by a spring; and the mounting rods having a threaded interior bore to threadably engage the inner cap.

7. The wheel rim cover for a vehicle wheel according to claim 6 wherein a screw is threaded into the threaded interior bore of each mounting rod and a spring around the mounting rod is captured between a head of the screw and the back wall of the inner cap.

8. The wheel rim cover for a vehicle wheel according to claim 7 wherein a washer abuts a bottom surface of the head of the screw.

9. The wheel rim cover for a vehicle wheel according to claim 6 wherein the outer cap has a larger diameter than the inner cap.

10. The wheel rim cover for a vehicle wheel according to claim 9 wherein the outer cap diameter is about one inch greater than the diameter of the inner cap.

* * * * *